United States Patent
Gupta et al.

(10) Patent No.: US 11,321,201 B2
(45) Date of Patent: *May 3, 2022

(54) USING A MIRRORING CACHE LIST TO MIRROR MODIFIED TRACKS

(71) Applicant: INTERNATIONAL BUSINESS MACHINES CORPORATION, Armonk, NY (US)

(72) Inventors: Lokesh Mohan Gupta, Tucson, AZ (US); Kevin J. Ash, Tucson, AZ (US); Kyler A. Anderson, Sahuarita, AZ (US); Matthew J. Kalos, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/818,521

(22) Filed: Mar. 13, 2020

(65) Prior Publication Data

US 2021/0286691 A1 Sep. 16, 2021

(51) Int. Cl.
*G06F 11/20* (2006.01)
*G06F 11/07* (2006.01)
*G06F 12/08* (2016.01)
*G06F 12/12* (2016.01)
*G06F 11/30* (2006.01)
(Continued)

(52) U.S. Cl.
CPC ........ *G06F 11/2056* (2013.01); *G06F 11/076* (2013.01); *G06F 11/3037* (2013.01); *G06F 12/0811* (2013.01); *G06F 12/0891* (2013.01); *G06F 12/123* (2013.01)

(58) Field of Classification Search
CPC ............. G06F 11/2056; G06F 12/0891; G06F 11/076; G06F 11/3037; G06F 12/0811; G06F 12/123
See application file for complete search history.

(56) References Cited

U.S. PATENT DOCUMENTS 9,063,945 B2 6/2015 Benhase et al.
9,317,423 B2 4/2016 Tatara et al.
(Continued)

OTHER PUBLICATIONS

Y. Wang, et al., "RWAR: A Resilient Window-consistent Asynchronous Replication Protocol", IEEE, Second International Conference on Availability, Reliability and Security (ARES'07), Apr. 2007, pp. 7.

(Continued)

*Primary Examiner* — Masud K Khan
(74) *Attorney, Agent, or Firm* — Konrad Raynes Davda & Victor LLP; David W. Victor (57) ABSTRACT

Provided are a computer program product, system, and method for using a mirroring cache list to mirror modified tracks for a primary storage in a cache to a secondary storage. Indication is made of a modified track for the primary storage stored in the cache in a mirroring cache list. The mirroring cache list is processed to select modified tracks in the cache to transfer to the secondary storage that have not yet been transferred. The selected modified tracks are transferred to the secondary storage. Indication of a modified track is removed from the mirroring cache list in response to demoting the modified track from the cache.

20 Claims, 8 Drawing Sheets

(51) Int. Cl.
*G06F 12/0891* (2016.01)
*G06F 12/123* (2016.01)
*G06F 12/0811* (2016.01)

(56) References Cited

U.S. PATENT DOCUMENTS

| | | |
|---|---|---|
| 9,442,859 B1 | 9/2016 | Bolt et al. |
| 9,507,527 B2 | 11/2016 | Benhase et al. |
| 10,282,303 B2 | 5/2019 | Ash et al. |
| 2003/0158999 A1 | 8/2003 | Hauck et al. |
| 2013/0086324 A1* | 4/2013 | Soundararajan .... G06F 12/0888 711/E12.024 |
| 2013/0185476 A1* | 7/2013 | Benhase ............. G06F 12/0808 711/103 |
| 2013/0191214 A1* | 7/2013 | Flinn ..................... G06N 20/00 705/14.53 |
| 2014/0365725 A1 | 12/2014 | Barrell et al. |
| 2016/0179672 A1* | 6/2016 | Dell .................. G06F 12/0822 711/122 |
| 2017/0052898 A1 | 2/2017 | Ash et al. |
| 2017/0091110 A1* | 3/2017 | Ash ..................... G06F 12/0868 |
| 2019/0034302 A1 | 1/2019 | Anderson et al. |
| 2019/0042096 A1* | 2/2019 | Anderson ............. G06F 3/0617 |
| 2019/0102303 A1* | 4/2019 | Wang .................. G06F 12/0831 |
| 2021/0286729 A1 | 9/2021 | Gupta |

OTHER PUBLICATIONS

R. Yan, et al., "An Implementation of Semi-synchronous Remote Mirroring System for SANs", GCC 2004 Workshops, LNCS 3252, Springer, Berlin, Heidelberg, Oct. 2004, pp. 229-237.
U.S. Appl. No. 16/818,608, filed Mar. 13, 2020, (18.921).
List IBM Patents and Applications Treated as Related, dated Mar. 13, 2020, pp. 2.
Office Action dated Jun. 2, 2021, pp. 20, for U.S. Appl. No. 16/818,608, (18.921).
Response dated Sep. 2, 2021, pp. 14, to Office Action dated Jun. 2, 2021, pp. 20, for U.S. Appl. No. 16/818,608, (18.921).
Final Office Action dated Sep. 17, 2021, pp. 21, for U.S. Appl. No. 16/818,608, (18.921).
Response dated Nov. 11, 2021, pp. 16, to Office Action dated Jun. 2, 2021, pp. 20, for U.S. Appl. No. 16/818,608, (18.921).

* cited by examiner

USING A MIRRORING CACHE LIST TO MIRROR MODIFIED TRACKS

BACKGROUND OF THE INVENTION

1. Field of the Invention

The present invention relates to a computer program product, system, and method for using mirroring cache list to mirror modified tracks.

2. Description of the Related Art

Data backup systems can provide continuous availability of production data in the event of a sudden catastrophic failure at a single point in time or data loss over a period of time. In one such disaster recovery system, production data is replicated from a primary storage system to a secondary storage system. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror.

Cache management algorithms select tracks to demote, i.e., remove, from cache to free space in the cache for further data. However, if a track in cache in a mirror copy relationship waiting to be mirrored to a secondary storage system is demoted from cache before being transferred, than that track will have to be retrieved from storage to transfer to the secondary storage system. Retrieving the track from storage to mirror results in greater latency than to transfer the track directly from the cache to the mirror copy site.

There is a need in the art for improved techniques for mirroring tracks to a secondary storage system.

SUMMARY

Provided are a computer program product, system, and method for using a mirroring cache list to mirror modified tracks for a primary storage in a cache to a secondary storage. Indication is made of a modified track for the primary storage stored in the cache in a mirroring cache list. The mirroring cache list is processed to select modified tracks in the cache to transfer to the secondary storage that have not yet been transferred. The selected modified tracks are transferred to the secondary storage. Indication of a modified track is removed from the mirroring cache list in response to demoting the modified track from the cache.

DETAILED DESCRIPTION

In the prior art, a track in a mirror copy relationship may be demoted from cache before being transferred to secondary storage to replicate, which will require the retrieval of the track from storage to transfer. Described embodiments provide improvements to computer caching technology for mirroring tracks by using a mirroring cache list to determine modified tracks to transfer to secondary storage. In further embodiments, the mirroring cache list is also used to determine tracks to demote. By using a mirroring cache list to select tracks for mirroring and demotion, there is a greater likelihood that a track will have been transferred to the secondary storage before being demoted because the demotion operation is considering a cache list from which tracks are being transferred so the oldest track on the mirroring cache list will likely have been transferred to secondary storage.

Further, described embodiments maintain tracks not in a mirrored copy relationship in a separate demote cache list that is used to select non-mirrored tracks for demotion. Because there is no concern that tracks not in a copy relationship are not demoted before being mirrored to the secondary site, these tracks may be immediately demoted from the separate demote cache list managed separately from the mirroring cache list. Further, if a track selected for demotion from the mirroring cache list has not been demoted, then described embodiments provide optimization techniques to determine whether to demote the track from the mirroring cache list without transferring, delay demoting from the mirroring cache list until the track is transferred, or leave the selected track on the mirroring cache list and demote a non-mirrored track from the demote cache list.

Figure 1:
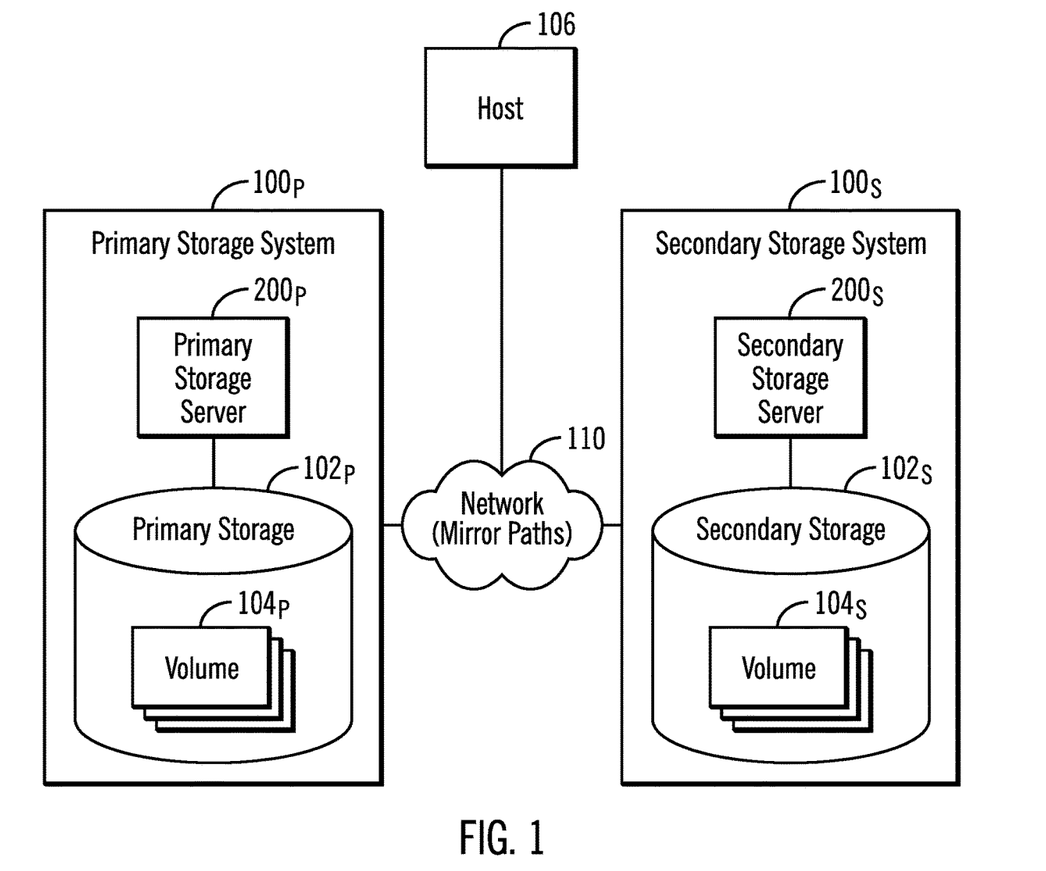
FIG. 1 illustrates an embodiment of a data replication environment.

FIG. 1 illustrates an embodiment of a data replication environment having a primary storage system $100_P$ including a primary storage server $200_P$ managing access to a primary storage $102_P$ and secondary storage system $100_S$, each including storage servers $200_P$ and $200_S$, respectively, managing access to volumes $104_P$ and $104_S$ configured in storages $102_P$ and $102_S$. One or more hosts 106 may direct I/O requests to the primary storage system $100_P$ or secondary storage system $100_S$, where the primary storage system $100_P$ may comprise a production storage to which most I/O requests are directed, and the secondary storage system $100_S$ is used mostly for mirroring data in case of a failover. The primary storage server $200_P$ may mirror data in the primary volumes $104_P$ to the secondary storage system $100_S$, also referred to a secondary storage or target storage, to maintain data in consistency groups at the second storage server $200_S$. Data may be written by the host 106 asynchronously, such that a write to a track in a mirror copy relationship at the primary storage server $200_P$ is considered complete when the data is stored in cache before being transferred to the secondary storage server $200_S$. The data may be mirrored over a network 110 having mirror paths for copying data between the primary storage system $100_P$ and the secondary storage system $100_S$.

Data in the volumes $104_P$, $104_S$ may be configured in ranks, where a rank is comprised of multiple extents, and wherein each extent is comprised of numerous tracks. Other storage units may be used than ranks, extents, and tracks. For instance, the volumes may comprise logical devices or drives configured in sections or partitions of storage other than ranks, that are comprised of groups of blocks or tracks. The term "rank" as used herein may refer to any section or area of storage having groups of tracks or blocks, referred to as extents.

The term "storage system" as used herein may refer to a storage server $200_P$, $200_S$ and/or the storage $102_P$, $102_S$ managed by the server. The term "server" or "storage server" may be used to refer to the servers $200_P$, $200_S$.

The storages $102_P$, $102_S$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $104_P$, $104_S$ may further be configured from an array of devices, such as Just a Bunch of Disks (JBOD), Direct Access Storage Device (DASD), Redundant Array of Independent Disks (RAID) array, virtualization device, etc. Further, the storages $102_P$, $102_S$ may comprise heterogeneous storage devices from different vendors and different types of storage devices, such as a first type of storage devices, e.g., hard disk drives, that have a slower data transfer rate than a second type of storage devices, e.g., SSDs.

The network 110 used by the storage systems $100_P$ and $100_S$ to mirror data may comprise mirror paths configured in a storage network such as one or more interconnected Local Area Networks (LAN), Storage Area Networks (SAN), Wide Area Network (WAN), peer-to-peer network, wireless network, etc.

Figure 2:
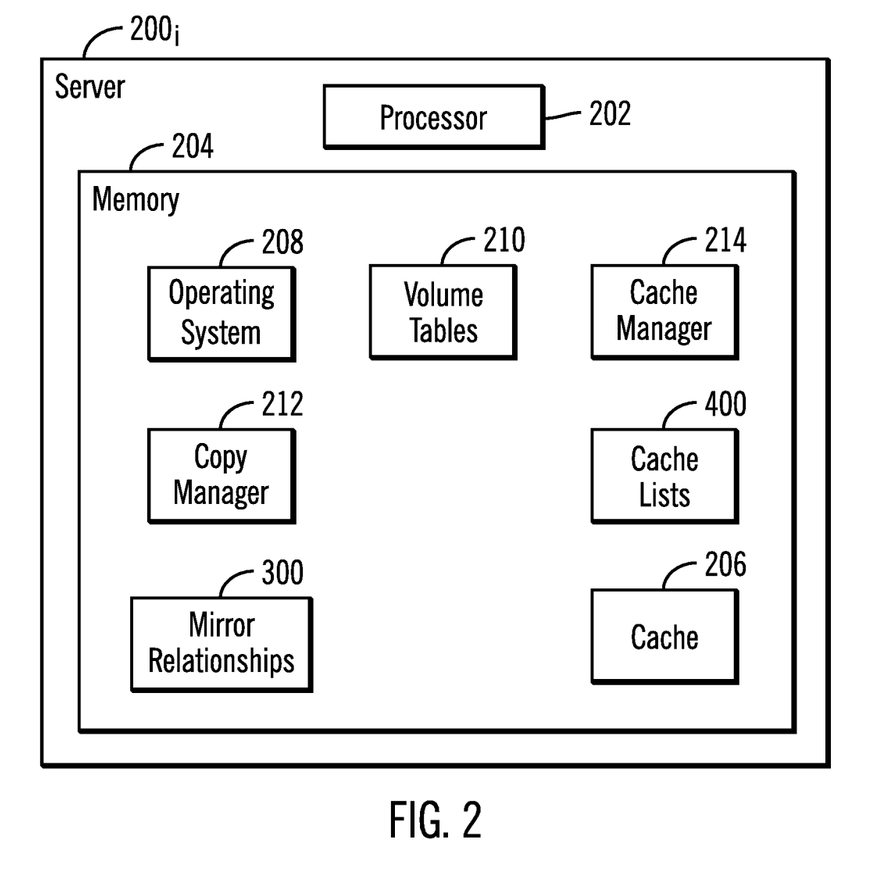
FIG. 2 illustrates an embodiment of components in a server in the replication environment of FIG. 1.

FIG. 2 provides an embodiment of components of a server $200_i$ involved in data mirroring, such as the primary storage server $200_P$, secondary storage server $200_S$. The server $200_i$ includes a processor 202 and a memory 204 including programs executed by the processor 202 as well as a cache 206 to cache read and write data for the first storage $102_P$. A portion of the cache 206 may also be used to mirror data in a consistency group. The memory 204 includes an operating system 208, which configures and manages volumes in attached storage and maintains volume tables 210, such as a volume table of contents (VTOC), file allocation table, etc., providing information on the configured volumes $104_i$. The operating system 208 further manages I/O requests with respect to the volumes $104_i$.

The memory 204 includes a copy manager 212 to create and manage mirror copy relationships 300 of source data extents or tracks in primary volumes $104_P$ in the primary storage system $100_P$, also referred to as source storage, to target data extents in the secondary storage system $100_S$, also referred to as the target storage, as part of consistency groups. In one embodiment, the primary storage system $100_P$ may have the source storage and the secondary storage system $100_S$ may have the target storage of mirror copy relationships to mirror source volumes or other data units to corresponding target volumes or data units. The copy manager 212 may mirror extents of tracks in the primary volume $104_P$ asynchronously or synchronously to a secondary volume $104_S$ in the secondary storage $102_S$ over mirror paths in the first network 110. Different data replication technologies may be used for the copy manager 212 to maintain remote copies of data at the secondary storage system $100_S$, such as International Business Machine Corporation's ("IBM") Metro Mirror Peer to Peer Remote Copy (PPRC), Extended Remote Copy (XRC), Coupled XRC (CXRC), Global Copy, and Global Mirror Copy, including programs provided by other vendors.

The server $200_i$ further includes a cache manager 214 that uses cache lists 400 to manage tracks in primary volumes $104_P$ that are stored in the cache 206 and determine when to demote tracks from cache to free space in the cache in a manner that optimizes the cache hit ratio.

The program components in the memory 204, including 208, 212, 214 are shown in FIG. 2 as program code loaded into the memory 204 and executed by the processor 202. Alternatively, some or all of the components functions may be implemented in hardware devices, such as in Application Specific Integrated Circuits (ASICs), Field Programmable Gate Array (FPGA) or executed by separate dedicated processors.

The memory 204 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

Figure 3:
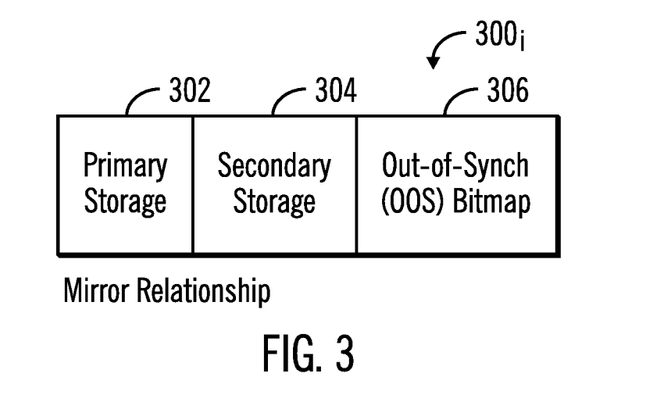
FIG. 3 illustrates an embodiment of a mirror relationship to copy tracks from a primary storage to a secondary storage.

FIG. 3 illustrates an embodiment of an instance of a mirror relationship $300_i$ in the mirror relationships 300 having information on a mirror copy relationship between a primary storage 302 and a secondary storage 304 and an out-of-synch (OOS) bitmap 306. The OOS bitmap 306 includes a bit for each track in the primary storage 302 to mirror to the secondary storage 304, and indicates whether a track corresponding to a bit needs to be copied from the primary storage 302 to the secondary storage 304 or does not need to be copied. The bit for a modified track may be set to cause the modified track to be copied to the mirror copy in the secondary storage 304 to maintain data consistency.

Figure 4A:
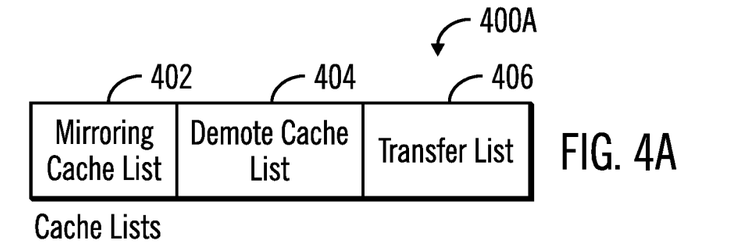
FIGS. 4A and 4B illustrate embodiments of cache lists to determine tracks to demote from the cache.

FIG. 4A illustrates an embodiment of cache lists 400A, used as the cache lists 400, including a mirroring cache list 402 indicating modified tracks in the cache 206 that are in a mirror relationship $300_i$ and need to be mirrored to the secondary storage $102_S$; a demote cache list 404 including modified tracks in the cache 206 that are not in a mirror relationship $300i$; and a transfer list 406 indicating modified tracks demoted from the mirroring cache list 402 before being transferred to the secondary storage $102_S$ and that need to be transferred as part of mirroring.

Figure 4B:
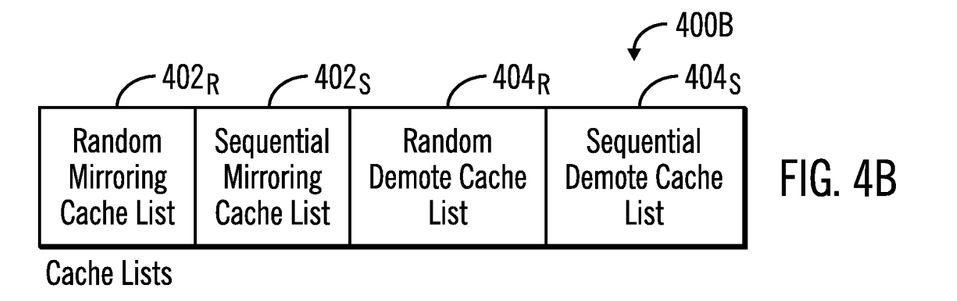

FIG. 4B illustrates an alternative embodiment of cache lists 400B, used as the cache lists 400, that includes a random mirroring cache list $402_R$ having randomly accessed data in a mirror relationship $300_i$; a sequential mirroring cache list $402_S$ having sequentially accessed, written, data in a mirror relationship $300_i$; a random demote cache list $404_R$ having randomly accessed data to demote that is not in a mirror relationship 300; and a sequential demote cache list $404_S$ having sequentially accessed data to demote that is not in a mirror relationship 300.

The copy manager 212 processes the mirroring cache list 402, $402_R$, $402_S$ and the transfer list 406 to determine modified tracks in a mirror relationship $300_i$ to copy to the secondary storage $102_S$. The cache manager 214 processes the mirroring cache list 402, $402_R$, $402_S$ and the demote cache list 404, $404_R$, $404_S$ to determine oldest tracks to demote from the cache 206. In further embodiments, there may be additional types of mirroring and demote cache lists in addition to or in place of the random and sequential types of cache lists.

Figure 5:
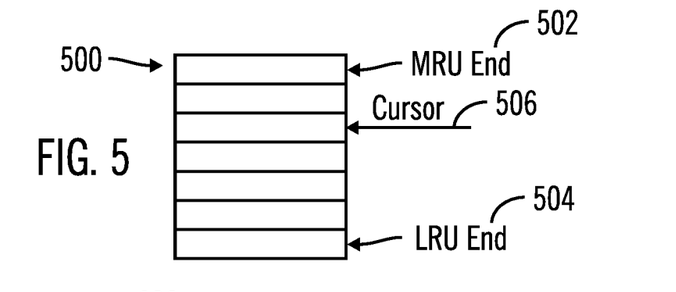
FIG. 5 illustrates an embodiment of a cache list.

FIG. 5 illustrates an embodiment of a cache list 500, such as one of cache lists 402, $402_R$, $402_S$, 404, $404_R$, $404_S$, 406 that includes temporal ordered list of entries indicating tracks to demote from cache, with a most recently used (MRU) end 502 having most recently accessed tracks in the cache 206 and a least recently used (LRU) end 504 having oldest or least recently used track in the cache 206. Tracks are added at the MRU end 502 of the cache list and demoted from the LRU end 504. The mirroring cache list 402, $402_R$, $402_S$ may further include a cursor 506 that indicates a next track in the cache 206 in a mirror relationship $300_i$ to copy to the secondary storage $102_S$. The cursor 506 starts at the LRU end 504 and is moved one track toward the MRU end 502 when the track addressed by the cursor 506 is transferred/mirrored to the secondary storage $102_S$.

In one embodiment, a track at the cursor 506 transferred to the secondary storage $102_S$ remains in a mirroring cache list 402, $402_R$, $402_S$ until the cache manager 214 demotes the track from the mirroring cache list 402, $402_R$, $402_S$. In this way, the mirroring cache lists 402, $402_R$, $402_S$ are used both to indicate tracks to copy to the secondary storage $102_S$ as part of a mirror relationship $300_i$ and tracks to demote from the LRU end 504 of the list.

Figure 6:
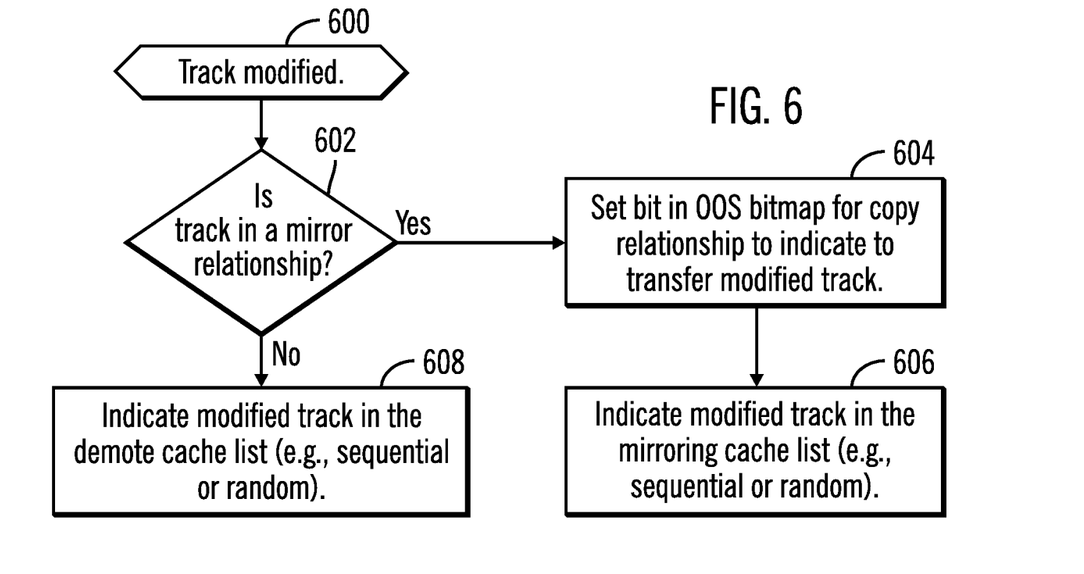
FIG. 6 illustrates an embodiment of operations to determine in which cache list to indicate a modified track.

FIG. 6 illustrates an embodiment of operations performed by the cache manager 214 to process a modified track in the cache 206, such as when access to the track is released. Upon modifying a track in the cache 206, if (at block 602) the track is in a mirror relationship $300_i$, such as in the primary storage 302 of a mirror relationship, then the bit for the modified track in the OOS bitmap 306 is set to indicate to transfer the modified track and the modified track is indicated (at block 606) at the MRU end 502 of the mirroring cache list 402. If (at block 602) the track is not in a mirror relationship, then the modified track is indicated (at block 608) at the MRU end 502 of the demote cache list 404.

With the embodiment of FIG. 6, if a modified track in the cache 206 is in a mirror relationship $300_i$, then it is placed in a separate mirroring cache list 402 that is used to determine both tracks to transfer to secondary storage $102_S$ and tracks to demote from the cache 206.

Figure 7:
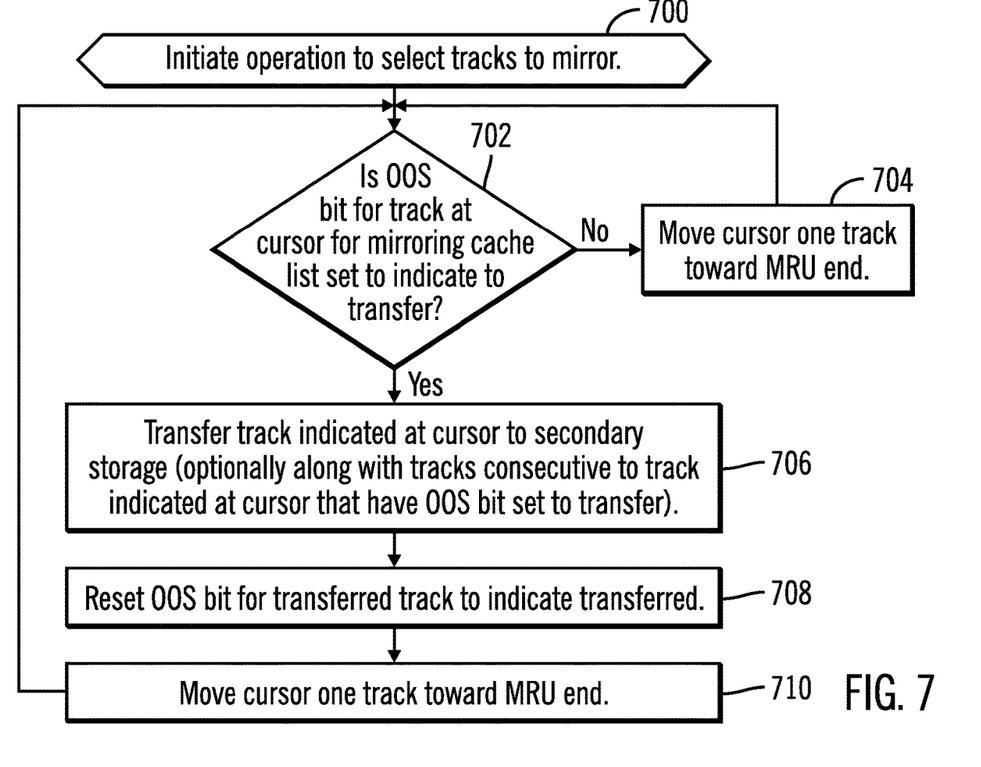
FIG. 7 illustrates an embodiment of operations to select tracks in cache to mirror.

FIG. 7 illustrates an embodiment of operations performed by the copy manager 212, such as one or more synchronization agents, to select tracks to mirror from the mirroring cache list 402. If (at block 702) the OOS 306 bit, for the track addressed by the cursor 506 in the mirroring cache list 402, is not set to indicate to transfer, then the cursor is moved one track toward the MRU end 502 and control returns to block 702 to continue processing tracks to transfer from the mirroring cache list 402. If (at block 702) the OOS 306 bit indicates to transfer, then the track indicated at the cursor 506 is transferred (at block 706) to the secondary storage $102_S$. If the OOS bitmap 306 indicates that consecutive tracks to the track to transfer have also not yet been transferred, then those consecutive tracks in the OOS bitmap 306 to the track at the cursor 506 may also be transferred to the secondary storage $102_S$ to optimize mirroring operations. The OOS 306 bit for the transferred track(s) are reset (at block 708) to indicate transferred. The cursor 506 is moved (at block 710) one entry toward the MRU end 502. Control then returns to block 702 to continue processing tracks to transfer from the mirroring cache list 402.

With the embodiment of FIG. 7, the mirroring cache list 402 is processed to select the oldest tracks in the cache 206 that have not yet been transferred to secondary storage $102_S$, which are at a cursor 506 initially positioned at the LRU end 504. The transferred tracks at the cursor 506 remain in the mirroring cache list 402 until they are demoted.

Figure 8:
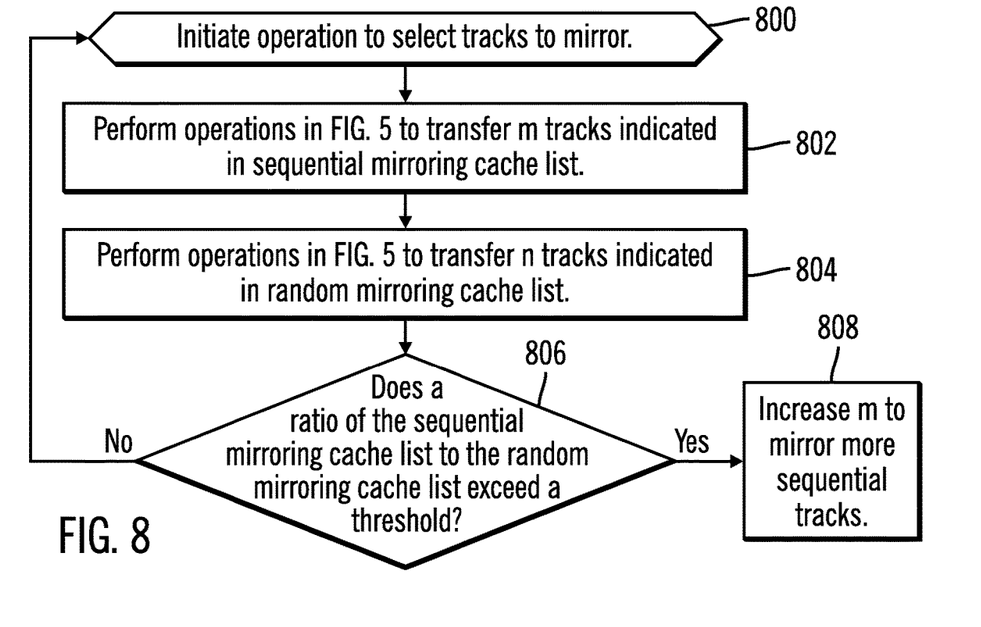
FIG. 8 illustrates an embodiment of operations to select sequential or random tracks in cache to mirror.

FIG. 8 illustrates an embodiment of operations performed by the copy manager 212, such as one or more synchronization agents, to select tracks to mirror from the random mirroring cache list $402_R$ and the sequential mirroring cache list $402_S$ in embodiments where random accessed tracks and sequentially accessed tracks are processed in separate cache lists. Upon initiating (at block 800) an operation to select tracks in the cache 206 to mirror, the copy manager 212 performs (at block 802) the operations in FIG. 5 to transfer m tracks indicated in the sequential mirroring cache list $402_S$. The copy manager 212 further performs (at block 804) operations in FIG. 5 to transfer n tracks indicated in the random mirroring cache list $402_R$. In certain embodiments, the copy manager 212 may prioritize the transfer of tracks from the sequential mirroring cache list $402_S$ by transferring more tracks from the sequential mirroring cache list $402_S$ than the random mirroring cache list $402_R$, such that m is greater than n.

If (at block 806) the ratio of sequential mirroring cache list $402_S$ to the random mirroring cache list $402_R$ exceeds a threshold ratio such as based on the number of tracks or size in the mirroring cache list $402_S$, $402_R$, then m is increased (at block 808) to increase the rate at which sequentially accessed tracks are transferred.

With the embodiment of FIG. 8, sequentially accessed modified tracks are transferred at a higher rate than randomly accessed modified tracks to optimize mirroring transfers and because sequentially accessed tracks may arrive in the cache 206 at a higher rate than randomly accessed tracks.

Figure 9:
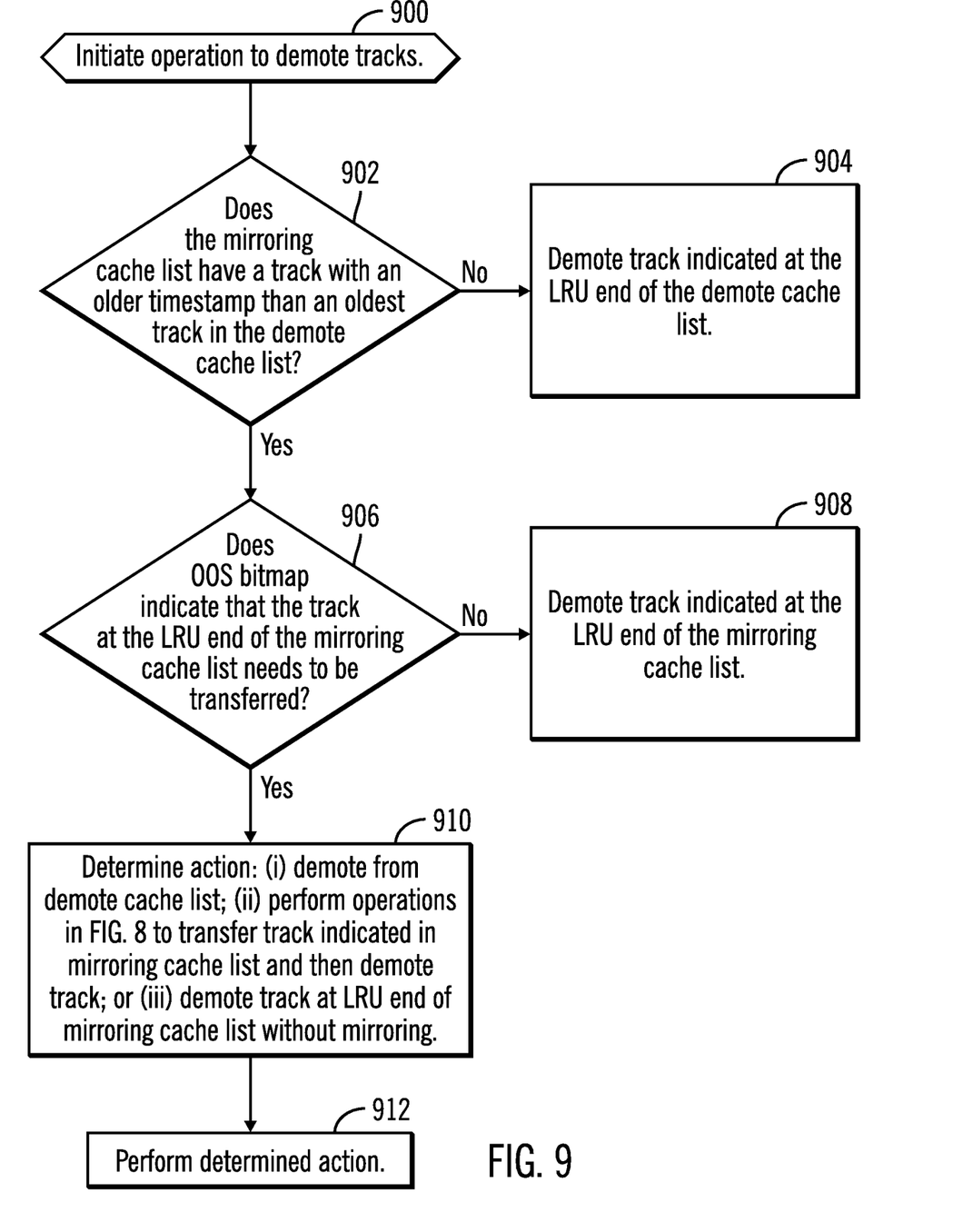
FIG. 9 illustrates an embodiment of operations to select tracks to demote from cache.

FIG. 9 illustrates an embodiment of operations performed by the cache manager 214 to demote tracks from the mirroring cache list 402 and the demote cache list 404. Upon initiating (at block 900) an operation to demote tracks, if (at block 902) the mirroring cache list 402 does not have a track with an older timestamp than an oldest track in the demote cache list 404, i.e., the tracks at the LRU ends 504 of the lists 402, 404, then the track indicated at the LRU end 504 of the demote cache list 404 is demoted (at block 904). If (at block 902) the mirroring cache list 402 has a track with an older timestamp than the oldest track in the demote cache list 404, then the cache manager 214 determines (at block 906) whether the OOS bitmap 306 bit for the track at the LRU end 504 of the mirroring cache list 402 indicates that the track needs to be transferred. If (at block 906) the track at the LRU end 504 does not need to be transferred, then the track indicated at the LRU end 504 of the mirroring cache list 402 is demoted (at block 908). If (at block 906) the OOS bitmap 306 indicates that the track at the LRU end 504 of the mirroring cache list 402 needs to be transferred, then a situation has occurred where the cache manager 214 is trying to demote a track from cache 206 that has not yet been transferred to the secondary storage $102_S$.

If the track selected to demote has not yet been transferred, the cache manager 214 determines one of the following actions: (1) demote from demote cache list 404; (2) perform the operations in FIG. 8 to transfer the track indicated in the mirroring cache list 402 and then demote the track; or (3) demote the track at LRU end 504 of the mirroring cache list 402 without mirroring. The determined action is then performed (at block 912).

With the embodiment of operations of FIG. 9, if the cache manager 214 has selected a track to demote in the mirroring cache list 402 that has not yet been transferred to the secondary storage $102_S$, then the cache manager 214 needs to determine an optimal operation to handle. Demoting the track from the cache 206 without transferring would reduce data mirroring performance because the demoted track would have to be staged back into cache 206 from the primary storage $102_P$ to then mirror. However, switching to demote from the demote cache list 404 and not the mirroring cache list 402 may reduce the rate at which tracks in mirror relationships are demoted from the cache 206. The described embodiments select an option for handling the track to demote that has not yet been transferred to optimize performance considerations.

Figure 10:
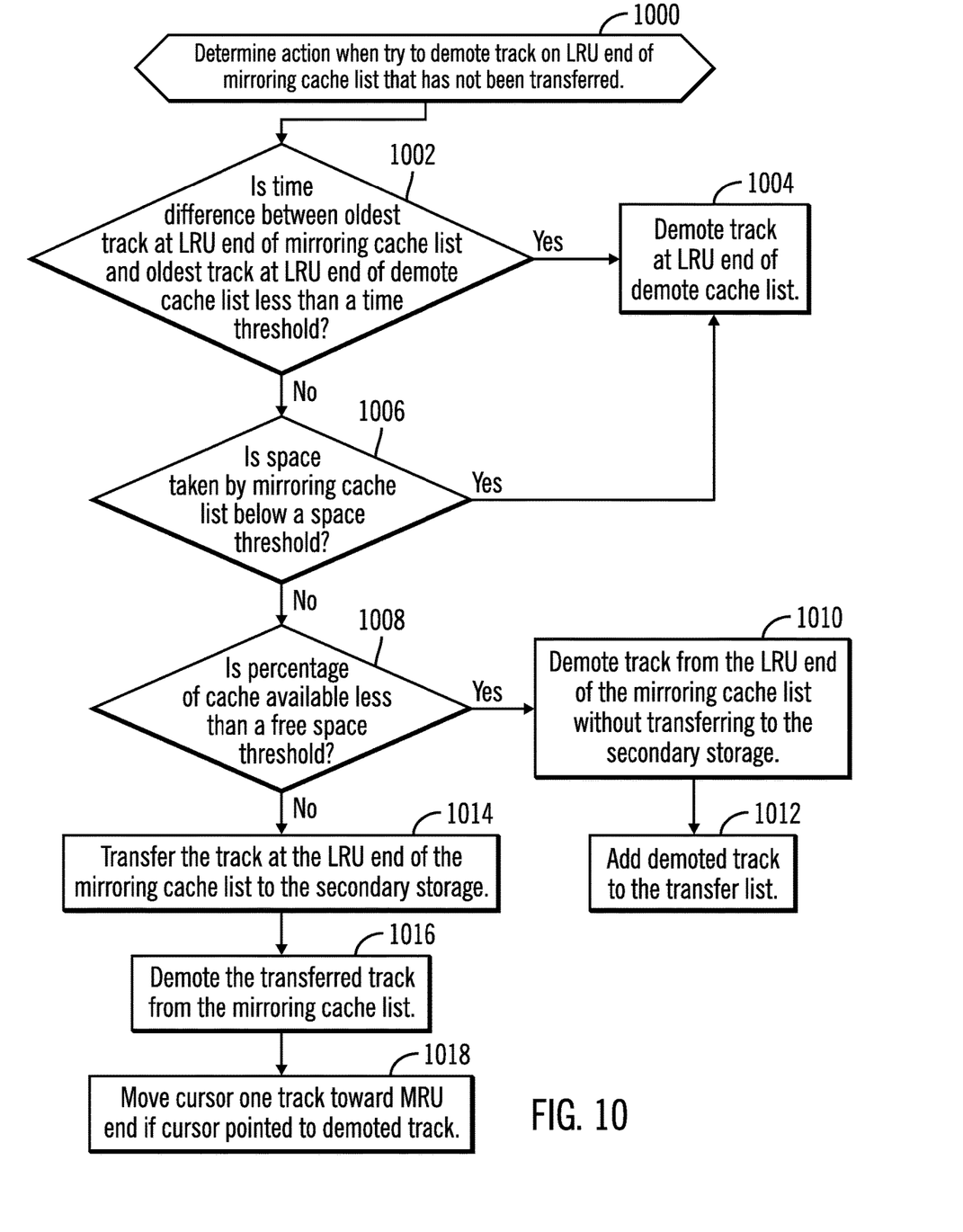
FIG. 10 illustrates an embodiment of operations to determine a track to demote if a selected track to demote has not yet been transferred to secondary storage.

FIG. 10 illustrates an embodiment of operations performed by the cache manager 214 to optimize the action determined at block 910 in FIG. 9 to select how to handle demotion of a track in a mirror relationship $300_i$ that has not yet been mirrored. Upon initiating (at block 1000) the operation to determine the optimal action when the track considered for demotion has not yet been mirrored, the cache manager 214 determines (at block 1002) whether a time difference between the oldest track at the LRU end 504 of the mirroring cache list 402 and the oldest track at the LRU end 504 of the demote cache list 404 is less than a time threshold. If the difference is less than the time threshold, then the track is demoted (at block 1004) from the demote cache list 404. Selecting to demote the track from the demote cache list 404 (at block 1004) has the benefit of providing further time for the track in cache 206 to be mirrored to the secondary storage $102_S$ and there is minimal effect on the hit ratio of leaving that track to mirror in cache 206 because the time difference between the track in cache 206 and oldest track in demote cache list 404 to demote is below a threshold.

If (at block 1002) the time difference is greater than the threshold, then a determination is made (at block 1006) whether the space used by the mirroring cache list 402 is below a space threshold. If so, then control proceeds to block 1004 to demote the track from the demote cache list 404 because the mirroring cache list 402 is not using a determined excessive amount of space, so leaving a track indicated in the mirroring cache list 402 and instead selecting from the demote cache list 404 will not negatively impact the size of the mirroring cache list 402. If (at block 1006) the space taken by the mirroring cache list 402 exceeds the space threshold, then a determination is made (at block 1008) as to whether the percentage of cache 206 that is available is less than a free space threshold. If so, then the track at the LRU end 504 of the mirroring cache list 402 is demoted (at block 1010) without transferring the track to the secondary storage $102_S$ and indication of the demoted track is added to the transfer list 406 for later transfer. The track is immediately demoted from the mirroring cache list 402 (at block 1010) because the cache 206 free space has fallen below a low free space threshold of concern so that a track should be immediately demoted from the mirroring cache list 402 to free cache 206 space. The track demoted from the mirroring cache list 402 is added (at block 1012) to the transfer list 406, which is later processed to transfer tracks.

If (at block 1008) the percentage of cache 206 available space is not less than the free space threshold, i.e., not too low, then the track at the LRU end 504 of the mirroring cache list 402 is transferred (at block 1014) to the secondary storage $102_S$ and the transferred track is demoted (at block 1016) from the mirroring cache list 402. The cursor 506 is moved (at block 1018) toward the MRU end 502 if the cursor 506 is pointing to the demoted track. With the embodiment of operations at blocks 1014-1016 the demotion is delayed from the mirroring cache list 402 to allow for the transfer of the track to the secondary storage $102_S$ because cache free space is not below a free space threshold, so the demotion can be delayed to allow the transfer to occur and optimize the mirror transfer by transferring from the cache 206.

The embodiment of operations of FIG. 10 optimizes the determination of how to handle a situation where a track selected to demote from the mirroring cache list 402 has not yet been transferred by considering factors such as the relative age of the track selected for demotion from the mirroring cache list 402 and cache 206 space usage concerns.

Figure 11:
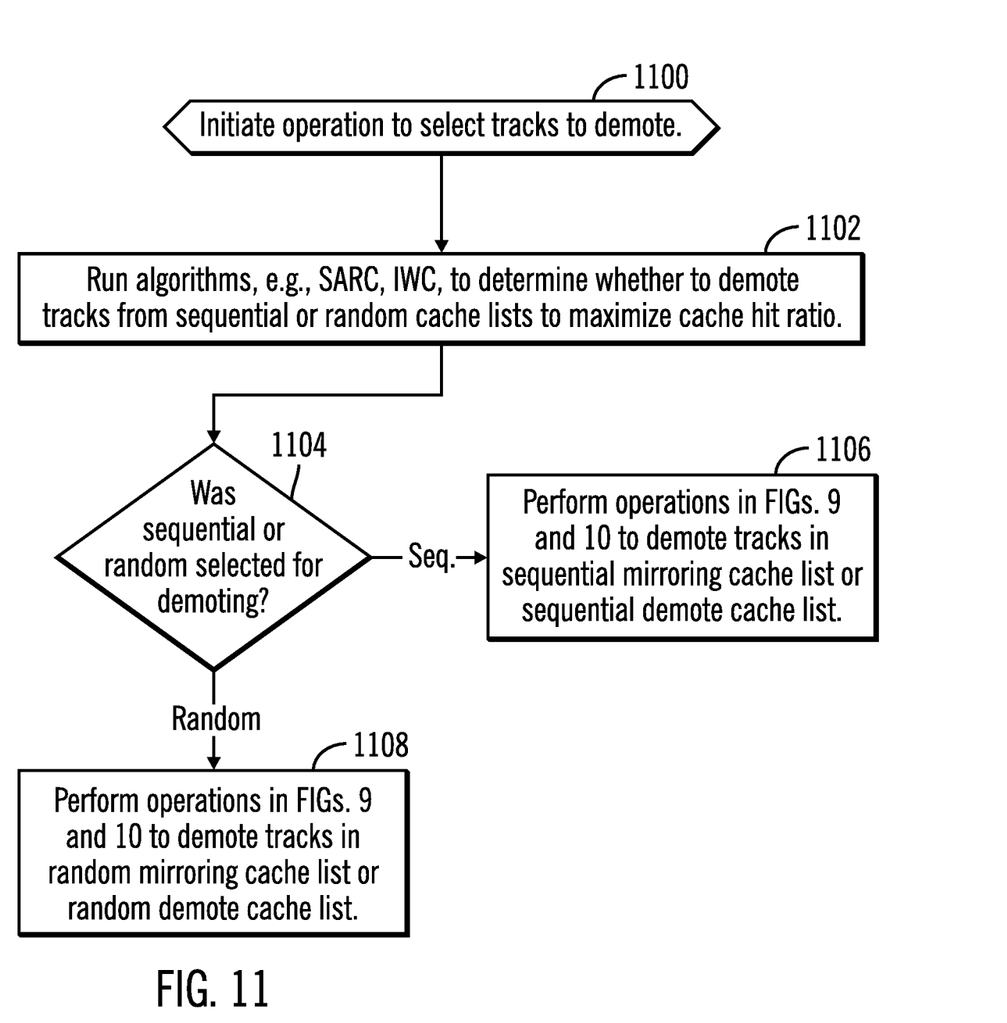
FIG. 11 illustrates an embodiment of operations to select sequential or random tracks in cache to demote.

FIG. 11 illustrates an embodiment of operations performed by the cache manager 214 to select tracks to optimize selection to demote tracks from the sequential or random cache lists. Upon initiating (1100) an operation to demote, the cache manager 214 runs (at block 1102) one or more algorithms to determine whether to demote tracks from the sequential or random cache lists to maximize the overall cache 206 hit ratio. In one embodiment, the cache manager 214 may use the Simple Adaptive Replacement Cache (SARC) or Intelligent Write Caching (IWC) available in the IBM DS8000 storage controllers to select whether to demote sequential or random tracks by considering whether the size of the sequential or random cache lists should be increased to improve the cache hit ratio. If (at block 1104) the sequential tracks were selected for demoting, then the cache manager 214 performs (at block 1106) the operations in FIGS. 9 and 10, with respect to the sequential cache mirroring list $402_S$ and sequential demote cache list $404_S$ operating as the mirroring cache list 402 and the demote cache list 404, respectively, to demote tracks from the sequential mirroring cache list $402_S$ or the sequential demote cache list $404_S$. If (at block 1104) the random tracks were selected for demoting, then the cache manager 214 performs (at block 1108) the operations in FIGS. 9 and 10, with respect to the random mirroring cache list $402_R$ and random demote cache list $404_R$ operating as the mirroring cache list 402 and the demote cache list 404, respectively, to demote tracks from the random mirroring cache list $402_R$ or the random demote cache list $404_R$.

With the embodiment of FIG. 11, cache hit optimization algorithms are used to select whether to demote tracks from the random or sequential cache lists, and then the optimizations of FIGS. 9 and 10 are performed to further optimize selection of the demote cache list or mirroring cache list of the selected random or sequential category to optimize demotion to increase likelihood tracks to mirror remain in cache 206 for mirroring.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
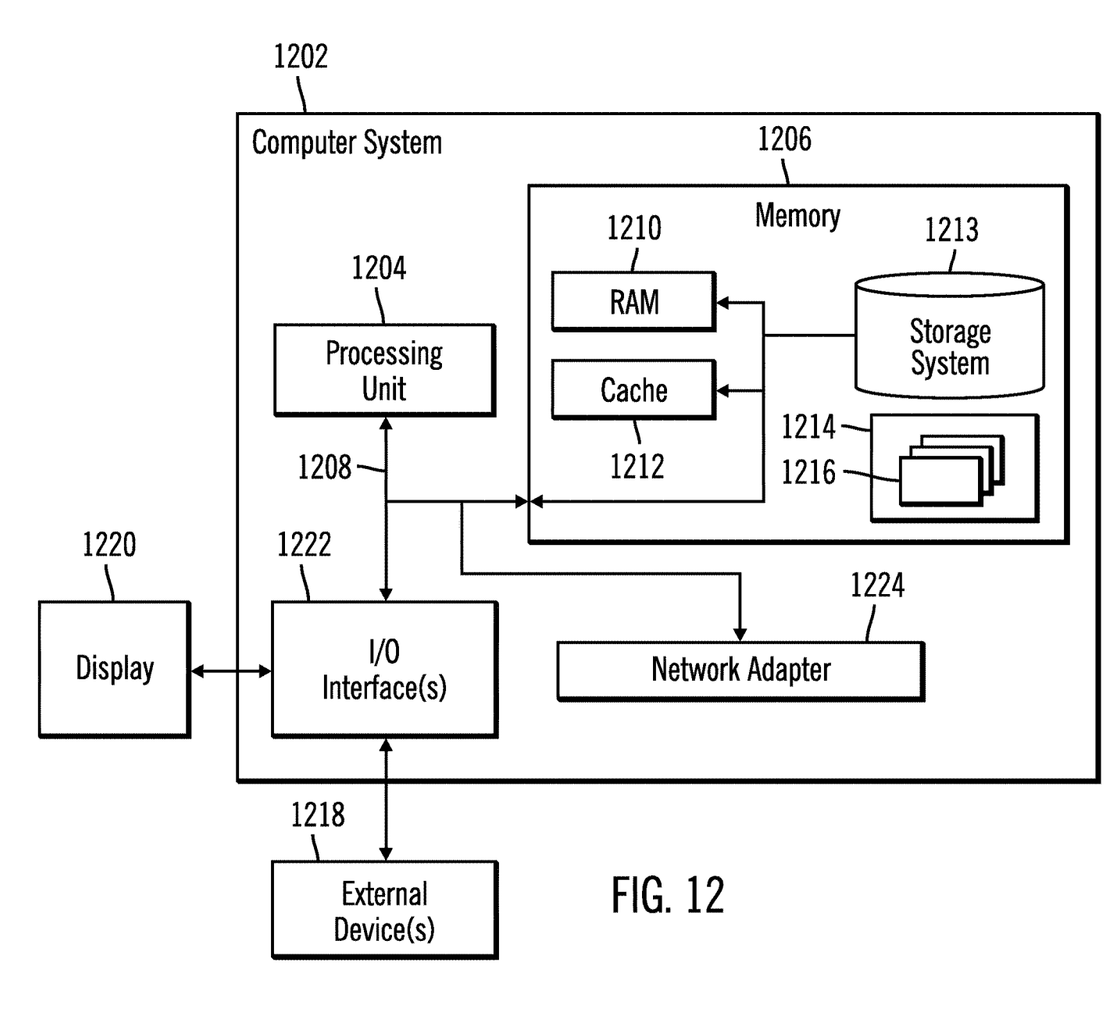
FIG. 12 illustrates a computing environment in which the components of FIG. 1 may be implemented.

The computational components of FIG. 1, including the host 106 and servers 200$_P$, 200$_S$ may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for mirroring modified tracks for a primary storage in a cache to mirror to a secondary storage, wherein the computer program product comprises a computer readable storage medium having program instructions embodied therewith, the program instructions executable by a processor to cause operations, the operations comprising:

indicating a modified track for the primary storage stored in the cache in a mirroring cache list;

processing the mirroring cache list to select modified tracks in the cache to transfer to the secondary storage that have not yet been transferred;

transferring the selected modified tracks to the secondary storage;

demoting a modified track from the cache indicated in the mirroring cache list; and removing indication of the demoted modified track from the mirroring cache list in response to demoting the modified track from the cache.

2. The computer program product of claim 1, wherein the mirroring cache list comprises a least recently used (LRU) list, wherein the operations further comprise:

maintaining a cursor pointing to a track indicated in the mirroring cache list;

selecting a modified track indicated in the mirroring cache list pointed to by the cursor to transfer to the secondary storage; and moving the cursor to point to indication of a next modified track closer to a most recently used (MRU) end of the mirroring cache list, wherein indication of the selected modified track is maintained in the mirroring cache list after moving the cursor.

3. The computer program product of claim 1, wherein the mirroring cache list comprises a first mirroring cache list to indicate a first type of modified track, wherein the operations further comprise:

indicating a modified track for the primary storage in the cache of a second type of modified track in a second mirroring cache list;

alternating selecting modified tracks indicated in the first mirroring cache list and the second mirroring cache list to transfer to the secondary storage; and removing indication of a modified track from the second mirroring cache list in response to demoting the modified track from the cache.

4. The computer program product of claim 3, wherein the alternating selecting modified tracks from the first and the second mirroring cache lists comprises:

transferring a first number of modified tracks indicated in the first mirroring cache list to the secondary storage; and transferring a second number of modified tracks indicated in the second mirroring cache list to the secondary storage, wherein the first number is greater than the second number.

5. The computer program product of claim 4, wherein the operations further comprise:

determining whether a ratio of the first mirroring cache list to the second mirroring cache list exceeds a threshold; and increasing the first number of modified tracks in response to determining that the ratio exceeds the threshold.

6. The computer program product of claim 3, wherein the first type of modified track results from a sequential write process and wherein the second type of modified track results from a random write process.

7. The computer program product of claim 1, wherein the operations further comprise:

maintaining a data structure indicating for each track in the primary storage whether the track is modified and needs to be transferred to the secondary storage or is unmodified and does not need to be transferred to the secondary storage; and in response to selecting a modified track to transfer to the secondary storage, processing the data structure to determine consecutive modified tracks to the selected modified track not yet transferred to the secondary storage to transfer to the secondary storage with the selected modified track.

8. The computer program product of claim 1, wherein the operations further comprise:

determining whether a modified track is to be copied to the secondary storage, wherein the modified track is indicated in the mirroring cache list in response to determining that the modified track is to be copied to the secondary storage; and indicating the modified track in a demote cache list in response to determining that the modified track is not to be copied to the secondary storage, wherein modified tracks are selected from the demote cache list to demote from the cache to the primary storage.

9. A system, for mirroring modified tracks for a primary storage to a secondary storage, further comprises:

a processor;

a cache accessible to the processor; and a computer readable storage medium having program instructions embodied therewith, the program instructions that when executed by the processor causes operations, the operations comprising:

indicating a modified track for the primary storage stored in the cache in a mirroring cache list;

processing the mirroring cache list to select modified tracks in the cache to transfer to the secondary storage that have not yet been transferred;

transferring the selected modified tracks to the secondary storage;

demoting a modified track from the cache indicated in the mirroring cache list; and removing indication of the demoted modified track from the mirroring cache list in response to demoting the modified track from the cache.

10. The system of claim 9, wherein the mirroring cache list comprises a least recently used (LRU) list, wherein the operations further comprise:

maintaining a cursor pointing to a track indicated in the mirroring cache list;

selecting a modified track indicated in the mirroring cache list pointed to by the cursor to transfer to the secondary storage; and moving the cursor to point to indication of a next modified track closer to a most recently used (MRU) end of the mirroring cache list, wherein indication of the selected modified track is maintained in the mirroring cache list after moving the cursor.

11. The system of claim 9, wherein the mirroring cache list comprises a first mirroring cache list to indicate a first type of modified track, wherein the operations further comprise:

indicating a modified track for the primary storage in the cache of a second type of modified track in a second mirroring cache list;

alternating selecting modified tracks indicated in the first mirroring cache list and the second mirroring cache list to transfer to the secondary storage; and removing indication of a modified track from the second mirroring cache list in response to demoting the modified track from the cache.

12. The system of claim 11, wherein the first type of modified track results from a sequential write process and wherein the second type of modified track results from a random write process.

13. The system of claim 9, wherein the operations further comprise:

maintaining a data structure indicating for each track in the primary storage whether the track is modified and needs to be transferred to the secondary storage or is unmodified and does not need to be transferred to the secondary storage; and in response to selecting a modified track to transfer to the secondary storage, processing the data structure to determine consecutive modified tracks to the selected modified track not yet transferred to the secondary storage to transfer to the secondary storage with the selected modified track.

14. The system of claim 9, wherein the operations further comprise:

determining whether a modified track is to be copied to the secondary storage, wherein the modified track is indicated in the mirroring cache list in response to determining that the modified track is to be copied to the secondary storage; and indicating the modified track in a demote cache list in response to determining that the modified track is not to be copied to the secondary storage, wherein modified tracks are selected from the demote cache list to demote from the cache to the primary storage.

15. A method for mirroring modified tracks for a primary storage in a cache to mirror to a secondary storage, comprising:

indicating a modified track for the primary storage stored in the cache in a mirroring cache list;

processing the mirroring cache list to select modified tracks in the cache to transfer to the secondary storage that have not yet been transferred;

transferring the selected modified tracks to the secondary storage;

demoting a modified track from the cache indicated in the mirroring cache list; and removing indication of the demoted modified track from the mirroring cache list in response to demoting the modified track from the cache.

16. The method of claim 15, wherein the mirroring cache list comprises a least recently used (LRU) list, further comprising:

maintaining a cursor pointing to a track indicated in the mirroring cache list;

selecting a modified track indicated in the mirroring cache list pointed to by the cursor to transfer to the secondary storage; and moving the cursor to point to indication of a next modified track closer to a most recently used (MRU) end of the mirroring cache list, wherein indication of the selected modified track is maintained in the mirroring cache list after moving the cursor.

17. The method of claim 15, wherein the mirroring cache list comprises a first mirroring cache list to indicate a first type of modified track, further comprising:

indicating a modified track for the primary storage in the cache of a second type of modified track in a second mirroring cache list;

alternating selecting modified tracks indicated in the first mirroring cache list and the second mirroring cache list to transfer to the secondary storage; and removing indication of a modified track from the second mirroring cache list in response to demoting the modified track from the cache.

18. The method of claim 17, wherein the first type of modified track results from a sequential write process and wherein the second type of modified track results from a random write process.

19. The method of claim 15, further comprising:

maintaining a data structure indicating for each track in the primary storage whether the track is modified and needs to be transferred to the secondary storage or is unmodified and does not need to be transferred to the secondary storage; and in response to selecting a modified track to transfer to the secondary storage, processing the data structure to determine consecutive modified tracks to the selected modified track not yet transferred to the secondary storage to transfer to the secondary storage with the selected modified track.

20. The method of claim 15, further comprising:

determining whether a modified track is to be copied to the secondary storage, wherein the modified track is indicated in the mirroring cache list in response to determining that the modified track is to be copied to the secondary storage; and indicating the modified track in a demote cache list in response to determining that the modified track is not to be copied to the secondary storage, wherein modified tracks are selected from the demote cache list to demote from the cache to the primary storage.

* * * * *